UNITED STATES PATENT OFFICE.

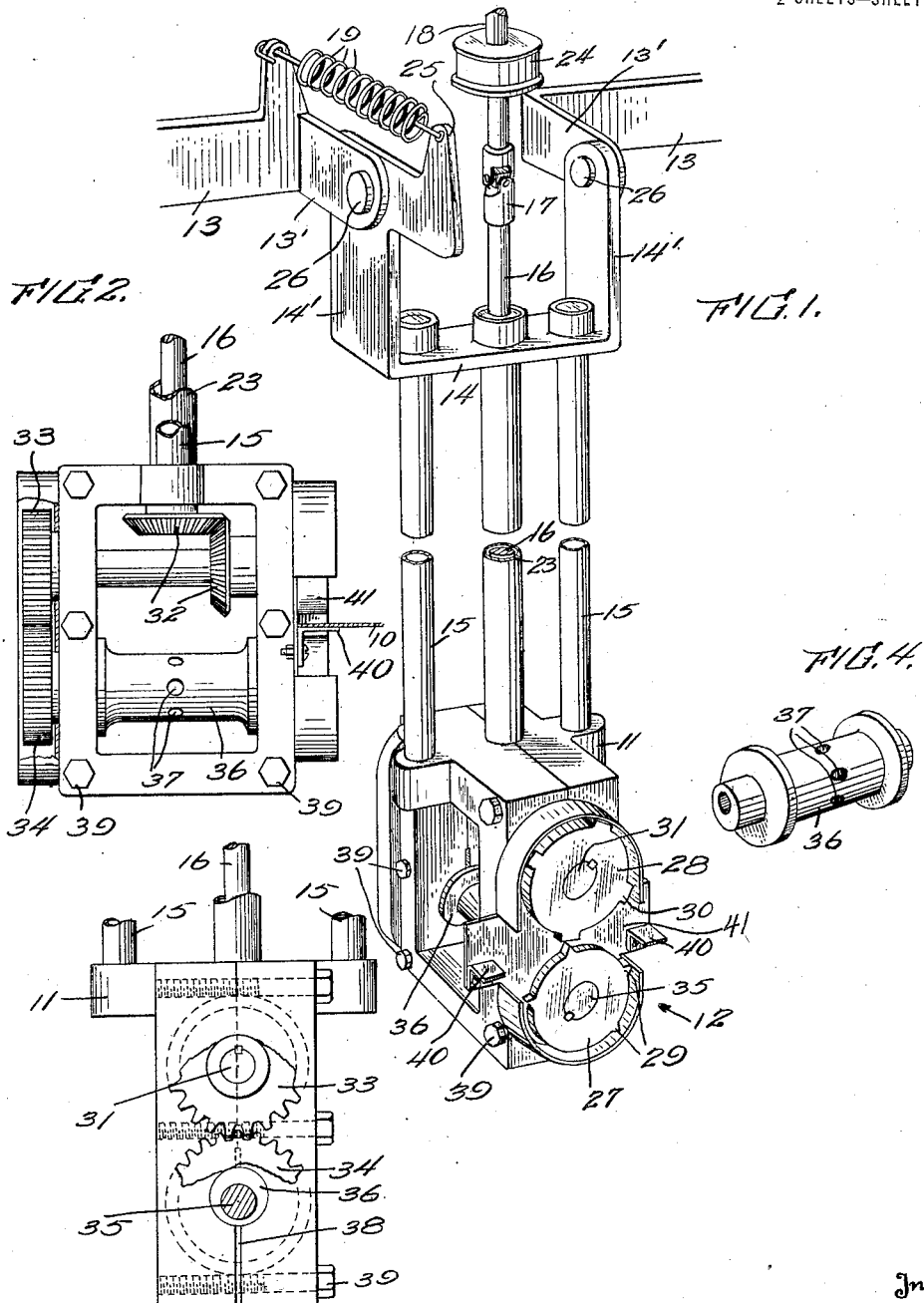

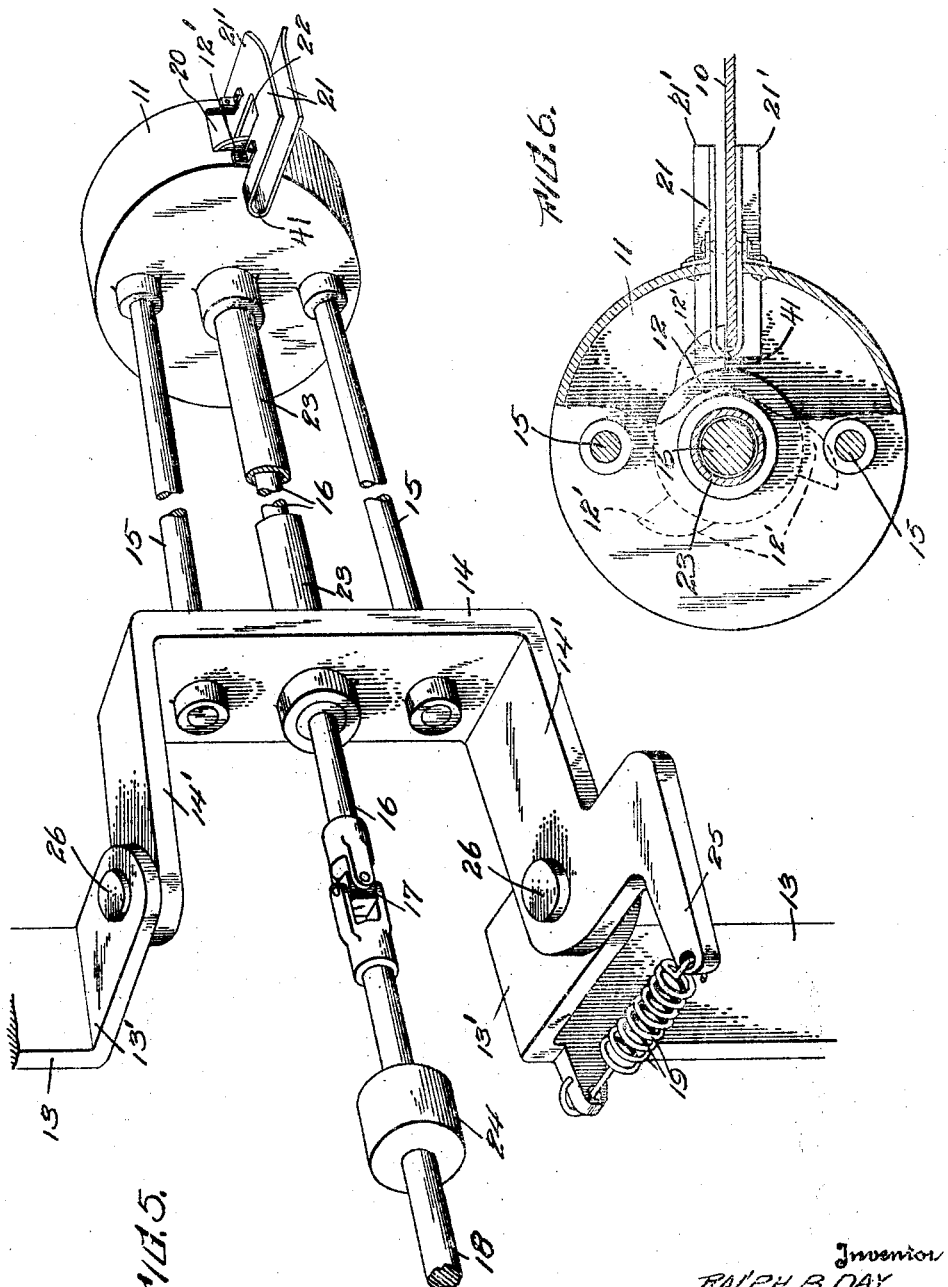

RALPH B. DAY, OF AKRON, OHIO, ASSIGNOR TO THE GOODYEAR TIRE & RUBBER COMPANY, OF AKRON, OHIO, A CORPORATION OF OHIO.

FABRIC-NOTCHING DEVICE.

1,403,740. Specification of Letters Patent. Patented Jan. 17, 1922.

Application filed September 21, 1918. Serial No. 255,121.

*To all whom it may concern:*

Be it known that I, RALPH B. DAY, a citizen of the United States, and resident of Akron, Ohio, have invented new and useful Improvements in Fabric-Notching Devices, of which the following is a specification.

My present invention relates broadly to new and useful improvements in apparatus for notching the edge portion of a moving strip of fabric, leather, or the like; and has particular reference to improvements in apparatus of this character which are especially designed for use in connection with the notching of the edge portions of strips of canvas fabric such as is used in the manufacture of pneumatic automobile tires.

One of the principal objects of the present invention is to provide a notching apparatus of the character specified which is so constructed and mounted that the notching device is free to adjust itself, by shifting or swinging laterally, to the waves or sinuosities of the edge of the fabric being notched.

The above and additional objects of a similar nature, which will be hereinafter more specifically treated, may be accomplished by such means as are illustrated in the accompanying drawings, described in the following specification, and then more particularly pointed out in the claims which are appended hereto and form a part of this application.

With reference to the drawings, wherein there has been illustrated preferred embodiments of the invention, and throughout the several views of which, similar reference numbers designate corresponding parts:

Figure 1 is a perspective view illustrating one form of the notching apparatus, a portion of the fabric upon which the device is designed to operate being shown therein in dotted lines.

Figure 2 is an enlarged partly broken side elevational view of the lower portion of the notching apparatus, showing, in cross section, the strip of fabric in position to be operated on by the notching device;

Figure 3 is a partly broken rear end elevational view of the lower portion of the notching apparatus;

Figure 4 is a perspective view of the eccentric adjusting sleeve for one of the shafts of the notching device;

Figure 5 is a perspective view illustrating another form of the notching apparatus; and Figure 6 is a partly broken detail view of the notching device shown in Figure 5 with the fabric strip shown in cross section and in position to be acted on by the notching device.

In the drawings the numeral 10 designates the strip of fabric which is fed from a supply roll, not shown, by calender rolls or suitable feeding mechanism. The latter does not constitute a feature of this invention and has therefore not been illustrated. The apparatus of the present invention is adapted, as previously stated, to notch at intervals the edge portion of the fabric strip.

As shown in the drawings, the constructions embodying my invention comprise a frame or casing 11, whereon or wherein is mounted a rotatable cutting or notching device 12; a pair of L shaped or equivalent brackets 13; a swingably mounted, preferably U shaped, bracket 14; a pair of parallel rods 15 by means of which the frame or casing 11 is connected to the pivotally mounted bracket 14; a drive shaft 16 connected by a universal joint 17 to a main power shaft 18; and a contractile spring 19 by means of which the notching device is maintained, in a manner to be later described in detail, in constant proper relation to the passing edge of the fabric to be notched.

The shaft 16 preferably passes through a sleeve 23 which extends between the bracket 14 and the frame or casing 11. The rods 15 are connected to the bracket 14 and to the frame or casing 11 for the purpose of supporting the frame or casing in fixed relation to the bracket in order that the frame or casing, and consequently the notching device 12, will swing with the bracket.

The shaft 18, which is, as previously stated, connected by a universal joint 17 to the shaft 16, may be driven from any suitable power source by belt over a pulley 24, or by any other suitable drive connection.

The brackets 13 are suitably supported on any structure adjacent to the path of the moving strip of the fabric 10, and they are spaced apart such a distance that their arms 13' properly receive between them the arms 14' of the U-shaped bracket 14. The arms 14' of the bracket 14 are connected by pivots 26 to the arms 13' of the brackets 13, and the bracket 14 is therefore adapted to swing on the brackets 13. One end of the spring 19 is connected to one of the brackets 13 or to any other suitable stationary part, and the other end of the spring is attached to the extension 25 on one of the arms 14' of the bracket 14.

In the form of the notching apparatus shown in Figures 1 to 4, the notching device consists of a rotary cutter 27 and an anvil or abutment 28. The rotary cutter 27 in this instance is preferably in the form of a disk with edged projections 29 thereon, and the anvil 28 is preferably rotatable and in the form of a disk with blunt projections 30 thereon. The blunt projections 30 are provided in place of a continuous anvil surface, in order to permit the cutters and the anvil to be entirely free of the fabric, except when the cutters are actually in cutting engagement therewith. This will permit a more flexible action between the swinging apparatus and the traveling fabric, as will be apparent.

The rotary anvil 28 is mounted on a shaft 31 which bears in the frame 11 and is connected by bevel gearing 32 to the drive shaft 16. The shaft 31 has thereon a spur wheel 33 in mesh with a spur wheel 34 which is mounted on the shaft 35 of the rotary cutter 27.

In order to permit adjustment of the rotary cutter 27 relatively to the rotary anvil 28, as the parts wear away, or to suit different thicknesses of fabric, the shaft 35 is arranged eccentrically in a sleeve 36 which bears in the frame 11 and is provided with openings 37 for the insertion of a suitable bar to turn the sleeve when it is desired to move the rotary cutter 27 toward or away from the anvil 28. The rear end portion of the sleeve 36 bears in a split plate 38 of the frame 11 so that by tightening the screws 39 connecting the split parts of the plate, the sleeve can be locked in adjusted position.

It is sometimes found desirable to merely bruise or weaken the edge of the fabric instead of completely cutting therethrough, and in order to accomplish this result the relative positions of the rotary cutter 27 and the rotary anvil 28 can readily be adjusted as just described, to operate on the fabric edge in the desired manner.

The edge portion of the moving strip of fabric can be supported and guided between the rotary cutter 27 and anvil 28 by substantially horizontal projections 40 on a substantially vertical guide plate 41 disposed on the forward end of the frame 11 at the rear of the rotary cutter 27 and anvil 28.

Upon reference to Figures 1 and 2, it will be seen that the spring 19, being contractile, tends to swing the bracket 14 and the parts carried thereby so that the guide 41 is moved into contact with the edge of the moving strip of fabric. Hence the spring 19 acts as a means for yieldably maintaining the notching device 12 in proper relation to the edge portion of the strip of fabric being operated on.

In the form of the notching apparatus shown in Figures 5 and 6, the frame 11 is in the form of a casing, which is preferably cylindrical in shape and has arranged therein the notching device 12 which in this instance consists of the rotary cutter connected to the drive shaft 16. The casing has an opening 20 in its peripheral wall, through which the separate teeth 12' of the rotary cutter are adapted to project for cutting or notching the edge portion of the passing strip of fabric 10.

A substantially U shaped guide member 21, preferably formed of sheet metal and with its walls flared at the rear end 21' to provide the entrance for the fabric edge, is attached to the casing 11 and so associated with the opening 20 that the edge of the fabric will be properly presented to the teeth 12' of the rotary cutter.

In this connection it will be noticed that a transverse slot 22 is formed in the upper and lower walls of the guide 21, to permit the cutter teeth 12' to pass through the guide in the required manner.

*Operation.*

When the feeding mechanism for the strip of fabric is brought into action, the strip of fabric is thereby moved past the notching device and its edge contacts with the substantially vertical face of the guide adjacent to the notching device. At the same time the driving mechanism for the shaft 16 is thrown into action and the rotary cutter is thereby operated. Thus as the fabric strip is moved with its edge against the vertical face of the guide, the edge portion of the strip of fabric is intermittently slit or notched by the successive teeth of the rotating cutter. It will be understood that the number of notches or slits made by the teeth of the rotary cutter can be governed by the number of teeth on the rotary cutter, and the relative speeds at which the strip of fabric is fed and the speed of rotation of the rotary cutter.

It will be noted, as an essential feature of this invention, that the notching device is swung laterally in correspondence with the sinuosities in the edge of the strip of fabric. All commercial fabrics, particularly those used in the rubber industry, have waves or sinuosities in the edge thereof, caused by various handlings, reeling up and drying, and etc. In consequence of the pivotally mounted supporting structure being arcuately movable, the notching device may swing in and out in accordance to the sinuosities in the edge of the fabric; thus an outward wave in the fabric edge will, by action against the guide, swing the notching device outwardly against the tension of the contractile spring 19. As soon as the outer wave in the edge of the fabric becomes an inward wave the spring will act to move the notching device back in proper relation to the moving edge of the fabric. Thus the notching device is always properly disposed with respect to the edge of the fabric.

It will be understood that changes in details of construction may be made without departing from the spirit of the invention or the scope of the appended claims. In this connection it may be mentioned that for the rods 15 any other suitable support for the frame or casing 11 may be substituted, and that for the brackets 13 and 14 may be substituted any other suitable supporting means. Also, the spring 19 may be replaced by any equivalent element adapted to act to dispose the guide and notching device in proper relation to the edge portion of the moving strip of fabric.

What I claim is:

1. An apparatus for notching the edge of a moving strip of material comprising, a swingable support suspended for oscillating movement and adapted to contact with the edge of the material, and a cutter mechanism mounted on the support embodying rotative elements having respectively a fixed axis of rotation relative to the support, said elements being adapted for cooperative intermittent cutting action.

2. An apparatus for notching the edge of a moving strip of material comprising, a swingable support suspended for oscillating movement and adapted to contact with the edge of the material, a cutter mechanism mounted on the support embodying rotative elements having respectively a fixed axis of rotation relative to the support, said elements being adapted for cooperative intermittent cutting action, and yielding means for normally swinging the support in one direction out of the perpendicular.

3. An apparatus for notching the edge of a moving strip of material comprising, a swingable support suspended for oscillating movement and adapted to contact with the edge of the material, a cutter mechanism mounted on the support embodying rotative elements having respectively a fixed axis of rotation relative to the support, said elements being adapted for cooperative intermittent cutting action, and means upon the support for guiding the fabric edge relative to the cutter mechanism.

4. An apparatus of the character specified, comprising a guide, a cutter for notching the edge portion of fabric as it is moved in contact with said guide, a yieldably mounted frame, a shaft carried by said frame and operatively connected to the cutter, a drive shaft, and a universal joint connection between the first mentioned shaft and the drive shaft.

5. An apparatus for notching the edge of a moving strip of fabric comprising, a swingable support suspended for oscillating movement toward or away from the fabric edge, and a cutter mechanism mounted upon the support comprising cooperative rotative elements one of which is provided with a fixed axis of rotation relative to the support the element cooperating therewith being adjustable with respect thereto for gauging the depth of the cut.

6. An apparatus for notching the edge of a moving strip of fabric comprising, a swingable support suspended for oscillating movement toward or away from the fabric edge, and a cutter mechanism mounted upon the support comprising cooperative rotative elements one of which is provided with a fixed axis of rotation relative to the support the element cooperating therewith having an eccentric mounting whereby it is adjusted with respect to the first element to gauge the depth of the cut.

7. An apparatus of the character specified, comprising a guide, a rotary cutter adapted to notch the edge portion of fabric as it is moved in contact with the guide, a pivotally mounted bracket, a shaft carried by the bracket and operatively connected to the rotary cutter, a drive shaft, a universal joint connection between the first mentioned shaft and the drive shaft, a stationary member, and an elastic connection between the stationary member and the bracket.

8. An apparatus for notching the edge of a moving strip of fabric comprising, a swingable support suspended for oscillating movement toward or away from the fabric edge, a cutter mechanism mounted upon the support comprising cooperative rotative elements one of which is provided with a fixed axis of rotation relative to the support the element cooperating therewith being adjustable with respect thereto for gauging the depth of the cut, and a universally jointed shaft carried upon the support for driving one of the elements.

9. An apparatus for notching the edge of a moving strip of fabric comprising, a swingable support suspended for oscillating movement toward or away from the fabric edge, a cutter mechanism mounted upon the support comprising cooperative rotative elements one of which is provided with a fixed axis of rotation relative to the support the element cooperating therewith being adjustable with respect thereto for gauging the depth of the cut, and yielding means adapted to normally swing the support in one direction out of the perpendicular.

In witness whereof, I have hereunto signed my name in the presence of two subscribing witnesses.

RALPH B. DAY.

Witnesses:
B. J. McDANEL,
R. S. TROGNER.